Sept. 9, 1958   W. L. SCHMIDT   2,851,382
METHOD FOR HYDROLYZING CELLULOSIC MATERIALS
Filed May 5, 1954
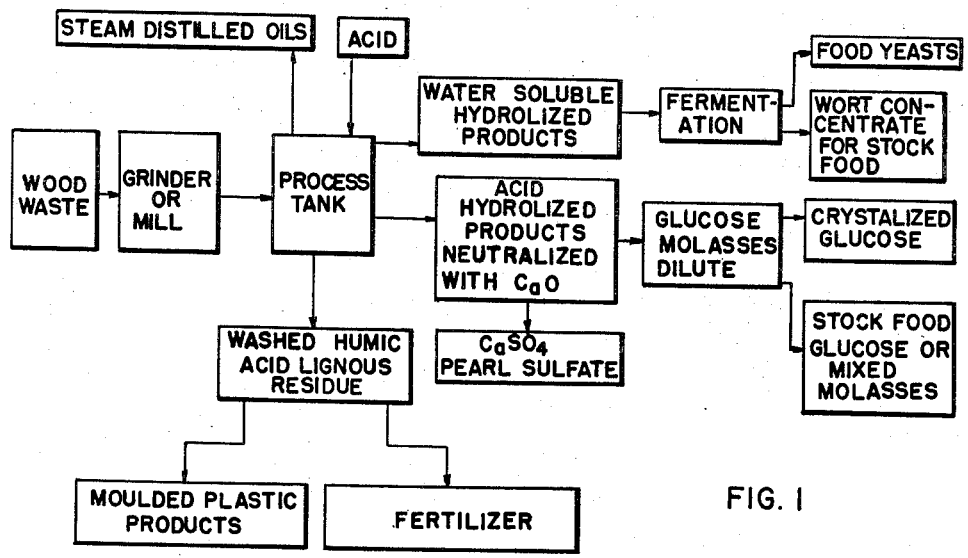
FIG. 1
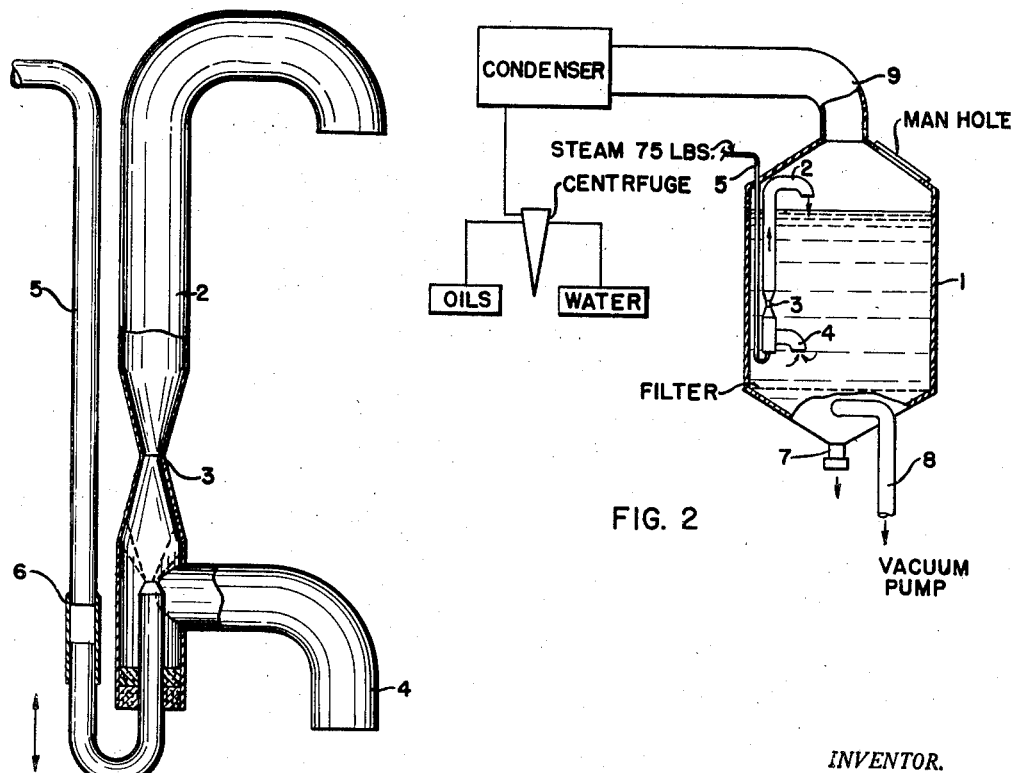
FIG. 2
FIG. 3
INVENTOR.
WALTER L. SCHMIDT

United States Patent Office 2,851,382
Patented Sept. 9, 1958

2,851,382

METHOD FOR HYDROLYZING CELLULOSIC MATERIALS

Walter L. Schmidt, Horners, Va.

Application May 5, 1954, Serial No. 427,791

4 Claims. (Cl. 127—37)

This invention relates to improvements in method and apparatus for the hydrolysis of wood waste and other cellulosic materials.

It has been known for many years that wood waste such as sawdust and the like can, by processes involving hydrolysis, be utilized for the production of yeast, glucose, cattle foods and other by-products, but such processes as heretofore practiced have required large capital investment because they are economical only when carried out as a large scale operation. Hence the use of such processes has been confined to areas where the wood waste is available in such quantities as to justify the installation and operation of plants capable of handling the large tonnage required for economical operation.

The principal object of my invention is to provide a process and apparatus for the recovery of the above mentioned products and other useful products for wood waste, which can be economically operated with much smaller units than are now capable of economical operation, whereby wood waste from smaller scale operations may be profitably utilized. Small scale sawmill operations are common throughout the entire country, but it is only in the large lumbering centers where any attempt has been made to profitably utilize the sawdust, slabs and other waste from the sawmill operation.

By my improved method and apparatus such waste may be profitably converted into useful products.

In the accompanying drawings I have illustrated an apparatus suitable for carrying out my proposed method and in the said drawings, Fig. 1 is a flow sheet showing the successive steps in the process and the products produced;

Fig. 2 is a sectional view showing the processing tank wherein the wood waste is hydrolyzed as the first step in the process; and Fig. 3 is a detail view of the apparatus preferably employed in securing a rapid, thorough hydrolysis of the wood waste.

Referring to the drawings, the preferred form of apparatus for carrying out my process consists of a processing tank 1 which may be an open atmospheric-pressure tank which is made of, or lined with, a close grained wood, acid resisting brick or acid resisting cement. The processing tank is covered with a hood of any suitable material to collect the steam and steam distilled products. The hood is connected by a vapor line 9 to a condenser so marked in the drawing. A centrifuge may be provided to recover oils carried over with the steam from the condensate.

The tank is provided with a suitable porous false bottom of any acid resisting ceramic to act as a filter. In order to expedite the hydrolysis of the wood waste in the tank a steam line is connected to a recirculating device of novel and unique design.

The device consists of a vertical pipe 2 fixedly supported in the tank 1 near the side wall as shown in Fig. 2, the end being bent inwardly and downwardly as shown. Near the bottom of the pipe 2 a venturi restriction 3 is provided, the approximate dimensions of the pipe and venturi being 8 inches and 3.2 inches, inside diameter respectively, for an installation having a capacity of 10 tons wood waste per hour.

Beneath the venturi the pipe 2 is provided with an inwardly projecting branch 4 whose end is turned downwardly as shown. The bottom of the pipe 8 is closed in any suitable manner to provide a support for the centrally positioned upturned end of a steam pipe 5 which terminates in an orifice of reduced diameter opposite the inwardly projecting branch 4. The steam pipe should be 1½ to 2 inches, inside diameter, and the orifice should be about one-quarter the diameter of the pipe. The lower end of the steam pipe is connected to the main portion of the pipe in a manner to permit vertical adjustment as indicated at 6 so that the discharge orifice may be accurately positioned with respect to the venturi.

Below the filter the tank 1 is provided with a discharge compartment having a gravity discharge pipe 7 and a suction discharge 8, either of which may be used as required, depending upon the particular material processed. The piping connections are not shown but it will be understood that the filtrate may be delivered through either outlet 7 or 8 to either the storage tank for the water soluble products or the storage tank for the acid hydrolyzed products as desired. Also, of course, the suction connection 8 may be employed to draw a partial vacuum in the discharge chamber to accelerate the filtering and the filtrate then delivered through the pipe 7 to the appropriate tank. For this procedure the discharge chamber is preferably of a capacity to receive all the liquid produced in a single batch operation. In operation, the charge of wood waste or other cellulose material which is preferably ground to a particle size on the order or 2 mm. least diameter is placed in the tank 1 and sufficient water added for the charge to flow freely in the tank and through the pipe 8 through the action of the steam discharge and the venturi. Steam pressure may be as low as will operate the venturi to raise the charge, which has previously been made fluid by the addition of water, to an elevation slightly above the uppermost level of the fluid charge. Preferable steam pressure to effect a rapid hydrolysis of the wood waste is between 35 lbs. and 100 lbs.

In the drawings I have indicated 75 lbs. as a suitable pressure. Should one of the final products desired be pure glucose it is desirable to process first with water to remove the water soluble factors and water hydrolyzed sugars, hexoses and pentoses. Up to (16) sixteen percent of the weight of the charge may be removed by this first aqueous hydrolysis and extraction. This step is usually effected in 15 to 30 minutes of operation when using a properly proportioned venturi unit.

The aqueous solution is permitted to drain off, by gravity or under partial vacuum, and stored for further processing, either by fermentation by one of the several yeasts, such as Torula utilis or other enzymes; or it may be combined with the products of the subsequent acid hydrolysis after the bulk of the glucose has been removed from this fraction. After the aqueous hydrolysate and extraction solution has been drawn off, the residue is again made fluid enough to be circulated by the venturi tube and sufficient sulfuric acid added to be 3% by weight of the original charge weight of dry wood waste. The acid hydrolysis is continued to completion, whereby from 46 to 60 percent of the original charge by weight will have been converted. This is usually effected in less than 1 hour of processing.

The variable yield is caused by the variable amounts of bark or other extraneous materials in the charge. The acid hydrolysate is then drawn off, the residue is then spray washed until acid free, the washing added to the acid hydrolysate which is then neutralized with lime and filtered. The calcium sulfate precipitate when spray washed and filtered is a marketable product of excellent novelty. The solute, or hydrolysate wood-molasses or glucose molasses is stored for further processing. This processing may be the recovery of glucose by customary vacuum pan or film surface evaporation resulting in a yield of glucose of from 40 to 56 percent of the original charge or wood waste.

The end liquors may be added to the first aqueous hydrolysate and extract for fermentation or evaporation by standard vacuum practice to dryness for stock feed or concentrated to a ±50 percent solid content for use as stock feed supplement per se.

If the residue from the acid hydrolysis is to be used or sold for fertilizer the calcium sulphate may be mixed with this residue. However, the residue in the processing tank after the completion of the acid hydrolysis is mostly humic acid and lignin and is itself a valuable plastic powder. It may be molded into any form under moderate pressures and subsequent application of heat up to 300° F. for a short time, 10 to 15 minutes to form acid-proof pipe, boards, etc., etc.

Products made from this lignin and humic acid residue are fungi resistant, termite proof, acid proof and have high dielectric values. By an additional caustic extraction the residue will give molded products that are both acid and caustic proof and capable of handling fluids at temperatures up to 300° F.

Should the end products desired be stock feed alone or for yeast fermentation the initial aqueous hydrolysis may be omitted, and the total yield may be obtained by the acid hydrolysis alone with subsequent neutralization, evaporation, concentration or fermentation.

A typical process run using a 10 ton charge (calculated on a dry basis) will yield:

±200 lbs. volatile oils dependent upon the percentage in the saw dust.
1.2 to 2 tons pentoses and tannin extract (aqueous hydrolysis products)
4.2 to 5.6 tons glucose
3.4 to 4 tons lignous material mostly humic acid or humus.

In the foregoing specification I have described in some detail a preferred form of my hydrolysing apparatus and its preferred method of operation but it is to be understood that my invention is not limited to the specific apparatus and method herein disclosed, except in so far as recited in the appended claims.

I claim:

1. A method of hydrolyzing cellulosic material which comprises establishing a body of water suspension of finely ground cellulosic material having a particle size of the order of 2 mm., establishing a small stream having a diameter of about 3 to about 8 inches of at least a portion of the aforesaid suspension within but isolated from said body, subjecting said stream to reduced pressure by means of a jet of steam under pressure of about 35 to about 100 pounds, restricting the cross-section of said stream whereby said cellulosic material is subjected to venturi action in the presence of water and heat from said steam to extract at least a portion of the water soluble constituents and water hydrolyzed constituents in said material, increasing the cross-section of said stream, discharging said stream containing extracted water soluble and hydrolyzed material into the body of water suspension, continuing the aforesaid operations including the venturi action on said cellulosic material until practically all of the water soluble and hydrolyzed constituents of said cellulosic material are extracted, and filtering said water soluble and hydrolyzed constituents from said cellulosic material.

2. A method of hydrolyzing cellulosic material which comprises establishing a body of water suspension of finely ground cellulosic material having a particle size of the order of 2 mm., establishing a small stream having a diameter of about 3 to about 8 inches of at least a portion of the aforesaid suspension within but isolated from said body, subjecting said stream to reduced pressure by means of a jet of steam under superatmospheric pressure of about 35 to about 100 pounds at high velocity, restricting the cross-section of said stream whereby said cellulosic material is subjected to venturi action in the presence of water and heat from said steam to extract at least a portion of the soluble constituents in said material, and to solubilize and hydrolyze other constituents thereof, increasing the cross-section of said stream, discharging said stream containing extracted soluble material into the body of water suspension, continuing the aforesaid operations including the venturi action on said cellulosic material until practically all of the soluble constituents of said cellulosic material are extracted, and filtering said water soluble constituents by gravity from said cellulosic material.

3. A method of hydrolyzing cellulosic material which comprises establishing a body of water suspension of finely ground cellulosic material having a particle size of the order of 2 mm., establishing a small stream having a diameter of about 3 to about 8 inches of at least a portion of the aforesaid suspension within but isolated from said body, subjecting said stream to reduced pressure by means of a jet of steam under pressure of about 35 to about 100 pounds, restricting the cross-section of said stream whereby said cellulosic material is subjected to venturi action in the presence of water and heat from said steam to extract at least a portion of the water soluble and hydrolyzed constituents in said material, increasing the cross-section of said stream, discharging said stream containing extracted soluble material into the body of said water suspension, continuing the aforesaid operations including the venturi action on said cellulosic material until practically all of the water soluble and hydrolyzed constituents of said cellulosic material are extracted, filtering said water soluble and hydrolyzed constituents from said cellulosic material via a filtering medium underneath said body, adding a new charge of water and sulfuric acid amounting to about 3% by weight of the original weight of the charge of dry cellulosic material, continuing the aforesaid operations to hydrolyze certain constituents of said cellulosic material by acid to produce soluble and acid hydrolyzed products and to extract said soluble and acid hydrolyzed constituents, and filtering water containing said acid hydrolyzed constituents and acid soluble constituents from the residue of said cellulosic material.

4. The method set forth in claim 3 in which the soluble acid hydrolyzed products are neutralized and are converted into glucose and sugar-containing products.

References Cited in the file of this patent

UNITED STATES PATENTS

| | | |
|---|---|---|
| 270,260 | Stiker | Jan. 9, 1883 |
| 449,687 | Maxim | Apr. 7, 1891 |
| 966,389 | Durant | Aug. 2, 1910 |
| 985,726 | Cohoe | Feb. 28, 1911 |
| 1,032,440 | Tomlinson | July 16, 1912 |
| 1,160,848 | Conklin | Nov. 16, 1915 |
| 1,323,540 | Moore | Dec. 2, 1919 |
| 1,428,217 | Classen | Sept. 5, 1922 |
| 1,536,463 | Westling | May 5, 1925 |
| 1,565,282 | Mabee | Dec. 15, 1925 |
| 1,740,441 | Chogo | Dec. 24, 1929 |
| 2,086,963 | Scholler | July 31, 1937 |
| 2,123,211 | Scholler | July 12, 1938 |
| 2,198,785 | Mohr | Apr. 30, 1940 |
| 2,202,573 | Cappock | May 28, 1940 |
| 2,302,022 | Giordani | Nov. 17, 1942 |
| 2,304,679 | Christensen | Dec. 8, 1942 |
| 2,633,436 | Martin | Mar. 31, 1953 |